3,089,831
Patented May 14, 1963

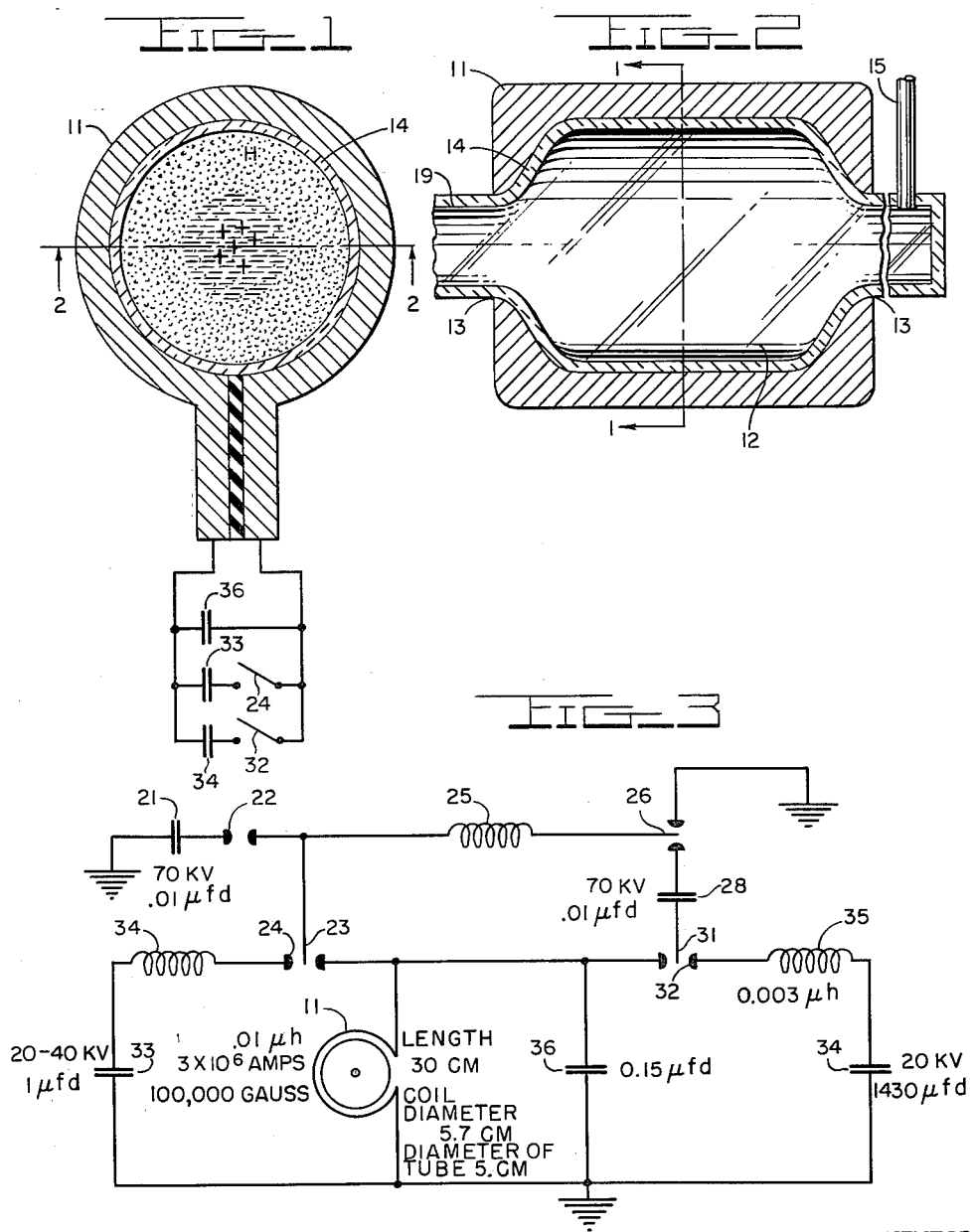

3,089,831
METHOD OF PRODUCING HIGH GAS TEMPERATURES
Alan C. Kolb, Alexandria, Va., assignor to the United States of America as represented by the Secretary of the Navy
Filed Aug. 13, 1959, Ser. No. 833,650
4 Claims. (Cl. 204—154.2)
(Granted under Title 35, U.S. Code (1952), sec. 266)

The invention described herein may be manufactured and used by or for the Government of the United States of America for governmental purposes without the payment of any royalties thereon or therefor.

The present invention relates to magnetohydrodynamic devices and more particularly to a method leading to the generation of high energy plasmas to produce therefrom high gas velocities, X-rays, and neutrons from a nuclear fusion reaction.

Magnetohydrodynamics is defined as the study of the interaction between electromagnetic fields and electrically conducting fluids and gases. In particular electromagnetic forces can be used to control the flow of ionized electrically conducting gases and can be used to accelerate or compress, contain and heat such a gas. Based on these principles, the production of thermonuclear reactions and in the end the generation of thermonuclear energy by heating and confining a gas comprising isotopes of hydrogen can be obtained. A controlled thermonuclear reaction can be obtained by heating a gas of deuterium or a mixture of deuterium and tritium to kinetic temperatures of about $5 \times 10^6$ degrees or more and controllably confining the gas at these temperatures for sufficiently long time to permit the fuel nuclei to undergo fusion with the consequent release of energy in the reaction region. At these high temperatures there will be a copious emission of neutrons and X-rays from the reacting region even though the reaction may not be self-sustaining. These neutrons and X-rays can be used in research applications. To this end a fusion reaction has been obtained for short periods of time. However, at higher temperatures the reaction will be self-sustaining when the thermonuclear energy produced exceeds the radiation and other energy losses. A controlled fusion reactor is known as a device within which appropriate isotopes of light elements are caused to undergo nuclear fusion, the end result being the controlled production and extraction of useful quantities of energy, in excess of that required to operate the device.

Heretofore, various types of devices have been used for producing high temperatures by gas discharges in deuterium and other gases, one of which is by use of the pinch effect. In one form of the pinch effect, an ionized gas is compressed by the self-magnetic forces of a current carrying discharge. However, inherent instabilities throw the hot gases to the walls which cools the gases down. Another disadvantage of the pinch geometry is the tendency for the plasma electrons to be accelerated to very high velocities by the applied electric field resulting in "runaway" electrons that eventually escape from the system.

Another device is disclosed in application Serial Number 748,096 filed July 11, 1958, now Patent No. 2,940,011, which operates to ionize and preheat a gas in a chamber by a high velocity, magnetically accelerated shock wave which reaches a final high temperature by compressing the shock preheated plasma by a rising axial magnetic field applied along the axis of the tube.

The present invention is an improvement over the prior art devices wherein the method of producing high temperature gases is carried out by first producing a plasma by preionizing and preheating a gas within a chamber by a radio frequency source and a discharge device such as a capacitor or by either one or the other or both and then at a predetermined time discharging a large current such as from a main capacitor bank into a coil surrounding the gas chamber to apply a final magnetic pressure to the preheated and ionized gas which may also contain a trapped magnetic field from the initial preheating discharge. Such a system is described in an article "Magnetic Compression of Shock Preheated Deuterium," by Alan C. Kolb appearing in Proceedings of the Second United Nations International Conference on the Peaceful Uses of Atomic Energy, vol. 31, pages 328–339. The method of the present invention depends on the axial magnetic fields from at least one current carrying coil surrounding a chamber to confine and compress the plasma produced initially. The initial discharge serves to preionize and preheat the gases in the chamber so that when, at a predetermined time, a capacitor bank is discharged into the coil or coils so that a magnetic field is set up about the ionized gas and any field which may be trapped in said ionized gas. The preheating discharge may also serve to initially detach and insulate the plasma from the walls of the chamber. The end result is a plasma along the axis which may contain an internal magnetic field confined by an externally generated magnetic field. The trapped magnetic field may serve the following functions: If the main discharge is generated at a time chosen so as to have the internal and external fields in opposite directions the interpenetration of said fields may serve to enhance the plasma heating and to increase the temperature thereby and also the number of fusion reactions in the case of deuterium or deuterium and tritium; if the trapped fields are in the same direction as the main external field confining the plasma, the stability has also been shown to be improved. Depending on the application of the method either a parallel (to the external field) or antiparallel trapped field may be required and can be controlled by the methods of the present invention. In addition, by delaying the main discharge relative to the time of the preheater discharge, the trapped field can be made negligible because of resistive dissipation. In that case the preheater serves only to produce an electrically conducting plasma that can be compressed and heated by means of the application of the main discharge producing a rising external field. It has been shown in an operating device that the above described functions of the preheater discharge occur in an operating device.

A plasma is a completely ionized gas which is regarded as a mixture of two gases, an electron gas and a positive ion gas in equal numbers charge-wise, the latter consisting of atoms stripped of one or more of their electrons. The external axial magnetic field confines the plasma to a cylindrical region (in cross-section) along the axis of the chamber wherein the external magnetic field prevents cooling of the plasma by contact with the surface of the chamber and provides heating due to the high currents and plasma compression.

The heating arises from Joule heating due to the high currents; by the shock waves set up when the main discharge starts, by the slow compression due to the rising fields and by the interaction of reverse trapped fields which may be present in the plasma and the main confining field. The use of magnetic mirrors and/or long tubes serves to increase the confinement time of the plasma by reducing the effect of the loss of plasma out the ends in the case of a finite tube. The method may also be used in heating plasmas contained in a chamber comprising a torous and coil array to produce appropriate confining fields.

It is therefore an object of the present invention to provide a method for plasma preionizing, preheating, and field trapping all leading to the production of high temperatures in a magnetically confined plasma.

Another object is to provide a method for producing high gas velocities, an X-ray source, and a neutron source.

Still another object is to provide a method for producing a controlled thermonuclear reaction and in the end a self-sustaining thermonuclear reaction.

Other and more specific objects of this invention will become apparent upon a careful consideration of the following detailed description when taken together with the accompanying drawings, in which:

FIGURE 1 illustrates a cross-sectional view taken transverse to the axis of a device for carrying out the method of this invention;

FIGURE 2 is a cross-sectional view taken along lines 2—2 of FIGURE 1;

FIGURE 3 is a schematic diagram of the electrical circuit required to carry out the method of this invention.

A device made in accordance to the present invention comprises in general terms a chamber which is adapted to be evacuated and then filled with a gas. To produce fusion reactions the gas shall include a supply of hydrogen isotopes. The chamber is surrounded by at least one coil for producing a magnetic field to compress and confine a plasma along the axis of the chamber when a high current is passed therethrough. Means is also provided for preheating the gas due to the action of induced currents when a high voltage is applied across the coil; for first partially preionizing the gases, for example by a high frequency field, so that when the voltage is applied, the gas breakdown is facilitated for producing trapped fields within the plasma to either aid in the heating or to improve the stability of the plasma so as to produce high final temperatures resulting in X-ray and neutron production. The device may also be used to produce high plasma velocities as the plasma escapes out the ends of the chamber.

Referring now to the drawings wherein like reference characters represent like parts throughout, there is shown in FIGURE 1 a cross-sectional view taken transverse to the axis of a preferred embodiment of the invention and in FIGURE 2 a section across the center of the device. The device, as shown, includes a coil 11 which has an inner radius along the axis for the greater part of the length 12 which may be larger than the radius at the ends 13 thereof which forms a coil having a smaller area at the ends than over the greater length. An insulating tube 14 such as quartz is provided with a gas inlet 15 at one end and open at the opposite end 19 for evacuation purposes by any suitable evacuating means connected thereto. The insulating tube is placed within the coil to conform to the inner configuration thereof. The coil when connected to a suitable electrical circuit provides an axial magnetic field along the tube which may be strongest at the ends 13 to provide a magnetic mirror effect to inhibit the losses of the particles out the ends of the chamber. The device has been operated with and without mirrors. The basic heating mechanism is the same in both cases.

In order to generate strong magnetic fields in a long single-turn coil, very high currents are required. In carrying out the method of the present invention currents from about 500,000 amperes to about 5,000,000 amperes will be used which produces a magnetic field from about 60,000 gauss to about 500,000 gauss. The inductance of such a single turn coil is very low and of the order of about $10^{-2}$ $\mu$h. for a coil having a radius of about 3 cm. and a length of about 30 cm. so a very low inductance external circuit is required for efficient energy transfer to the coil and plasma. To meet these requirements, a main capacitor bank with a short circuit current capability of about $10^6$ amperes to about $10^7$ amperes is required, depending on the length and radius of the coil and field strength needed for effective confinement and heating.

The preheater and main capacitor banks are connected to the coil by a parallel copper plate transmission line using a suitable dielectric insulation or coaxial cables or a combination of transmission lines and coaxial cables. For conducting the necessary current, the collector plates and/or cables are connected between the coil and the capacitor banks. In producing the above-mentioned currents a number of capacitors are connected in parallel or in a series-parallel arrangement and the current is carried to the coil by a common transmission line and/or by a large number of cables. Suitable circuitry for carrying out the method of the present invention is shown by a schematic diagram in FIGURE 3 and the transmission line current collector plates are represented in FIGURE 1.

The circuitry includes three operative portions, one to generate a high voltage pulse for triggering the switches, one for preionizing and preheating the gas, and one for applying a final axial magnetic field to compress and confine the preionized, preheated gas. The circuitry includes in the triggering circuit a capacitor 21 connected to ground on one side and to a master triggering switch 22, the capacitor output line from the master trigger switch leads through separate lines to a group of triggering electrodes 23 of a preheater switch 24 and through a delay line 25 to the triggering electrodes 26 of a transmission line trigger switch 27. One side of the transmission line triggering switch leads to ground and the other side connects with a capacitor 28 which has the output line therefrom connected with a group of triggering electrodes 31 of the main transmission line switch 32. The preheater switch 24 controls the discharge of a high frequency (300–1000 kc./sec.) preheater bank of capacitors 33, through a preheater inductance 34 formed by the load conductor plate (current collecting plate and/or cables), the condenser discharge being conducted through the coil 11. The main transmission line switch 32 controls the discharge of the main energy storage capacitor 34 into the coil 11 through an inductance 35 formed by the capacitors 34, switches 32, and conductors to the load. The capacitor 36 in the circuit represents the capacitance of the large load conductor plate and/or cables. The values of the capacitors and inductors are representative for one operative circuit and can be changed to have different values for different operations without changing the scope of the invention. For example, higher currents would be required for larger coils.

The trigger electrode switches represented in the electrical circuit are made in accordance to the magnetically insulated switch disclosed in application Serial Number 767,998 filed October 17, 1958, and illustrated in FIGURE 1 of said application.

In operation of the device, the tube is filled with gas and all of the capacitors are charged by a suitable power supply, then the trigger capacitor 21 is discharged through the master trigger switch and a coaxial cable. The discharge of the triggering capacitor breaks down (ionizes) the gasses in the gap of the preheater switch 24 which permits the capacitor 33 to discharge through the coil 11. About one $\mu$sec. after the gas is ionized by the preheater discharge, a high-voltage pulse arrives through the delay line 25 at the transmission line trigger switch 26 which discharges capacitor 28. Capacitor 28 sends a high voltage pulse through coaxial cables to the trigger electrodes 31 of the main transmission line switches. The trigger electrodes fire switch 32 which discharges the main capacitor bank through the coil. Ideally, the load collector plate inductance, $L_p$, is made small compared to the load inductance $L_c$ so that a high voltage from the preheater appears across the coil. The collector plate and coil constitute a resonant circuit with a frequency $$f = (L_c C_p)^{-1/2}/2\pi$$

which is excited by the preheater discharge, where $C_p$ is the capacitance of the collector plate or capacitance of the preheater circuit as represented by capacitor 36 in the drawings. In carrying out the above operation the gas in the tube may first be partially ionized prior to preheating as for example by a suitable RF signal. An auxiliary coil system may also be used to produce a static magnetic field initially that can be trapped when the main discharge is fired.

The deuterium gas is admitted to the tube at low pressures and since the gas is not ionized there is little or no electrical current set up within the gas when a voltage is applied across the coil. Since the gas molecules initially have no electrical charge the electrical conductivity is small, a discharge of the preheater condenser through the coil produces a rapidly rising axial magnetic field along the entire length of the tube within the coil and entirely across the diameter of the tube. The rapidly changing field induces voltage gradients in the gas which causes the gas to ionize. Upon ionization of the gas to provide a plasma within the tube, electrical currents are set up in the plasma about the tube axis by induction. As a result, the plasma is heated to moderate temperatures and becomes a good electrical conductor so that the magnetic field lines initially present are tied to the plasma and trapped within the conducting plasma along the axis of the tube. The high electrical conductivity inhibits the diffusion of the magnetic field lines in the plasma which is referred to as the trapped field. In one mode of operation the main bank of capacitors are then triggered by the delay line 25 to discharge during the last part of the first half cycle of preheater discharge to discharge the main current through the coil 11. The main capacitor bank discharge through coil 11 causes a current flow therethrough which produces an axial magnetic field along the tube which now compresses both the ionized gas and the trapped internal magnetic field which was produced during the first half-cycle of the preheater discharge. Since the gas is now ionized and is a good electrical conductor the magnetic forces will compress the plasma. The main capacitor bank is connected to the coil 11 with an opposite polarity from that of the preheater so now the external magnetic field about the gas is an axial field but in an opposite direction to the trapped axial field. During the early stages of the compression of the ionized gas on the first or second half-cycle of the preheater capacitor bank and the first half-cycle of the main capacitor bank, the trapped magnetic field first increases in magnitude as the plasma radius diminishes and then decreases due to cancellation by the reverse external field which gradually penetrates the plasma. The mixing of the external field and the reversed trapped field enhances the energy transfer from the electromagnetic field to the ions and, as a result, particles with energies sufficient to cause a D—D reaction can easily be produced in times of approximately 1–5 μsec. by the shock waves, compression and the induced electric fields in the plasma. Due to the field mixing, the internal reversed magnetic field eventually becomes zero. The gas particles in the plasma are confined by the external magnetic field produced by current flow in coil 11 during the first half cycle of the main bank when the internal magnetic field passes through zero since the external field from the second half-cycle of the preheater and the first half-cycle of the main bank are in the same direction and do not cancel one another. As a result of the shockwaves, compression and the energy transfer to the plasma from the trapped field a burst of neutrons has been observed in a deuterium plasma. Production of neutrons is evidence that there are deuterons with sufficiently high energies to produce a nuclear fusion reaction. The production of fusion reactions a few microseconds after the start of the main discharge is observed to depend critically on the breakdown of the gas by the voltage from the preheater discharge, on the presence of the reversed trapped field and on the time the main capacitor bank is fired relative to the preheater discharge. By the method of this invention these factors can be controlled and the fusion yield can be optimized; the essential features being means for breaking down the gas initially in the tube and controlling the magnitude and direction of trapped fields during the preheating phase before the start of the main compression.

The electric field strength induced in the plasma by the mixing of magnetic fields can be controlled by varying either the internal or external magnetic field, or by changing the relative polarity of the preheating and main bank capacitors. It has been determined that the highest electrical fields are established in the plasma when the preheater and main bank capacitors are connected to the coil with an opposite polarity so that the internal and external fields are in the opposite direction, for the mode of operation described here. Other modes of operation are possible. For example, without pre-excitation by RF power the gas breakdown is accomplished on the second half-cycle of the capacitor discharge preheater and the magnetic field is trapped on the third half-cycle as described above during the first half-cycle with pre-excitation. In that case the main bank could be discharged during the third half-cycle of the preheater instead of on the first half-cycle as described above. In that case the two capacitor banks are charged to the same polarity. It is anticipated that the present method could also be used to produce high temperatures and fusion reactions by allowing the trapped fields in the plasma to decay before the start of the main discharge. To accomplish this, higher fields than used in the present device would be needed and other parameters changed accordingly. In that case the preheater function would be to provide a field-free plasma which could be compressed as described previously. One advantage of this mode of operation without a reverse trapped field could be the improvement of the plasma stability against radial and other oscillations. These various modes of operation are possible with the present method.

Obviously many modifications and variations of the present invention are possible in the light of the above teachings. It is therefore to be understood that within the scope of the appended claims the invention may be practiced otherwise than as specifically described.

What is claimed is:

1. A method of developing high gas temperatures within an evacuated cylindrical chamber to produce neutrons and X-rays which comprises admitting into and confining a suitable gas within said chamber, discharging first capacitor sources through a single turn coil means positioned about said chamber to preionize and preheat said gas within said chamber to produce a first axial magnetic field in said ionized gas, and discharging a second capacitor source through said coil means at a predetermined time relative to the discharge of said first capacitor sources to produce a second axial magnetic field in reverse direction to said first magnetic field to trap said first magnetic field within said ionized gas and within said second magnetic field, said second magnetic field compressing said ionized gas to a small volume along the axis of said chamber thereby raising the temperature of said ionized gas to produce X-rays by electron-ion collisions and neutrons by ion-ion collisions of isotopes of hydrogen during the first half cycle of the second magnetic field.

2. A method of developing high gas temperatures within an evacuated cylindrical chamber to produce neutrons and X-rays which comprises admitting into and confining a suitable gas in said evacuated chamber, discharging first capacitor sources through a single turn coil means positioned about said chamber to preionize and preheat said gas within said chamber and to produce a trapped magnetic field within said ionized gas with the lines of force along the axis of said chamber, and discharging a second capacitor source through said coil means with the second capacitor discharge having opposite polarity from the discharge of said first capacitor source, said second capacitor discharge producing an axial magnetic field about said preionized and preheated ionized gas and trapped magnetic field produced by said first capacitor discharges in reverse direction, said axial magnetic field produced by said second capacitor discharge compressing said ionized gas and magnetic field to a small cross sectional area along the axis of said chamber thereby raising the temperature of said ionized gas to produce X-rays by electron-ion collisions and neutrons by ion-ion collisions of isotopes of hydrogen during the first half cycle of the second magnetic field.

3. A method of developing high gas temperatures within an evacuated chamber to produce neutrons and X-rays which comprises admitting a suitable gas containing hydrogen isotopes into an evacuated cylindrical chamber and confining said gas in said chamber, partially ionizing said gas to facilitate the initial breakdown of said gas by the discharge of capacitor sources, discharging said capacitor sources through a single turn coil means positioned around said chamber to preheat and further ionize said partially ionized gas and to produce an axial magnetic field with the lines of force along the axis of and within said chamber, discharging a second capacitor source through said coil means to produce an axial magnetic field within said chamber outwardly of said preionized and preheated gas containing said axial magnetic field produced by said first capacitor discharge, said axial magnetic field produced by said second capacitor compressing said ionized gas and said magnetic field produced by said first capacitor discharge to a small cross sectional area along the axis of said chamber thereby raising the temperature of said ionized gas to produce X-rays by electron-ion collisions and neutrons by ion-ion collisions of isotopes of hydrogen.

4. A method of developing high gas temperatures within an evacuated cylindrical chamber to produce neutrons and X-rays as claimed in claim 3 wherein the magnetic field of said second capacitor is applied in reverse direction along the axis to the magnetic field of said first capacitor discharge.

References Cited in the file of this patent

UNITED STATES PATENTS

| | | |
|---|---|---|
| 2,463,545 | Langmuir | Mar. 8, 1949 |
| 2,826,708 | Foster | Mar. 11, 1958 |
| 2,991,238 | Phillips et al. | July 4, 1961 |
| 2,997,436 | Little et al. | Aug. 22, 1961 |
| 3,006,835 | Quinn et al. | Oct. 31, 1961 |
| 3,015,748 | Hartwig et al. | Jan. 2, 1962 |
| 3,016,342 | Kruskal et al. | Jan. 2, 1962 |

OTHER REFERENCES

Astronautics, vol. 3, No. 10, pp. 18 to 72 and 74, October 1958.

Nuclear Power, pp. 98 to 101, June 1959.

Nucleonics, February 1962, pp. 55–59.